United States Patent
Arai et al.

(10) Patent No.: US 12,285,810 B2
(45) Date of Patent: Apr. 29, 2025

(54) DRILL FOR CARBON-FIBER COMPOSITE MATERIAL

(71) Applicant: BIC TOOL CO., LTD., Tottori (JP)

(72) Inventors: Koichi Arai, Tottori (JP); Giichi Arai, Tottori (JP); Katsuyo Kimura, Tottori (JP); Satoshi Teshima, Tottori (JP)

(73) Assignee: BIC TOOL CO., LTD., Tottori (JP)

(*) Notice: Subject to any disclaimer, the term of this patent is extended or adjusted under 35 U.S.C. 154(b) by 555 days.

(21) Appl. No.: 17/619,207

(22) PCT Filed: Jun. 10, 2020

(86) PCT No.: PCT/JP2020/022895
§ 371 (c)(1),
(2) Date: Dec. 14, 2021

(87) PCT Pub. No.: WO2020/261999
PCT Pub. Date: Dec. 30, 2020

(65) Prior Publication Data
US 2022/0241873 A1 Aug. 4, 2022

(30) Foreign Application Priority Data
Jun. 26, 2019 (JP) .................. 2019-119010

(51) Int. Cl.
*B23B 51/02* (2006.01)
(52) U.S. Cl.
CPC ........ *B23B 51/02* (2013.01); *B23B 2226/275* (2013.01); *B23B 2251/08* (2013.01);
(Continued)
(58) Field of Classification Search
CPC .............. B23B 51/02; B23B 2226/275; B23B 2251/08; B23B 2251/12; B23B 2251/204; B23B 2251/443; Y10T 408/9097
(Continued)

(56) References Cited

U.S. PATENT DOCUMENTS 3,667,857 A * 6/1972 Shaner et al. .......... B23B 51/08
                                                         408/230
4,662,803 A    5/1987 Arnold
(Continued)

FOREIGN PATENT DOCUMENTS

DE    102018205938 A1 * 10/2019 ............. B23B 51/02
EP         2228159 A1     9/2010
(Continued)

OTHER PUBLICATIONS

European Search Report for Application No. 20831443.5 dated May 23, 2023.

*Primary Examiner* — Sunil K Singh
*Assistant Examiner* — Michael Vitale
(74) *Attorney, Agent, or Firm* — Kelly & Kelley, PLLC

(57) ABSTRACT

The drill of the invention has: two cutting edges, each having a main cutting edge and a thinned cutting edge, wherein two relief surfaces formed symmetrically around rotation axis, first and second margin portions are formed, the first margin portions have a forward-end small-diameter portion with diameter smaller than the drill diameter, that is formed from the side of the drill forward-end toward the drill rearward-end, the second margin portions have a second forward-end small-diameter portion with diameter smaller than the first forward-end small-diameter portion, that is formed from the side of the drill forward-end toward the side of the drill rearward-end, the first forward-end small-diameter portion and the second forward-end small-diameter portion have inclination portions, the diameters of which gradually increase from the side of the drill forward-end toward the side of the drill rearward-end, and the inclination portions of the first forward-end small-diameter portion have relief surfaces.

9 Claims, 6 Drawing Sheets

(52) U.S. Cl.
CPC ..... *B23B 2251/12* (2013.01); *B23B 2251/443* (2013.01); *Y10T 408/9097* (2015.01)

(58) Field of Classification Search
USPC .......................................................... 408/230
See application file for complete search history.

(56) References Cited

U.S. PATENT DOCUMENTS

| | | | | |
|---|---|---|---|---|
| 2010/0232899 | A1* | 9/2010 | Saito | B23B 51/00 408/227 |
| 2011/0211924 | A1* | 9/2011 | Yanagida | B23B 51/02 408/229 |
| 2013/0307178 | A1* | 11/2013 | Kress | B23B 51/009 264/156 |
| 2015/0375356 | A1 | 12/2015 | Haeger | |
| 2019/0232392 | A1* | 8/2019 | Tsutsumi | B23B 51/02 |
| 2019/0308254 | A1* | 10/2019 | Arai | B23B 51/02 |
| 2020/0282472 | A1* | 9/2020 | Yamamoto | B23B 51/02 |
| 2020/0324347 | A1* | 10/2020 | Kauper | B23B 51/009 |

FOREIGN PATENT DOCUMENTS

| | | | | |
|---|---|---|---|---|
| JP | 97510/1990 U | | 8/1990 | |
| JP | 6-39617 A | | 5/1994 | |
| JP | 2005305610 A | * | 11/2005 | |
| JP | 2006-88267 A | | 4/2006 | |
| JP | 2010-214478 A | | 9/2010 | |
| JP | 2012-192514 A | | 10/2012 | |
| JP | 2017077597 A | * | 4/2017 | |
| JP | 2017-202541 A | | 11/2017 | |
| JP | 2018-510072 A | | 4/2018 | |
| JP | 6501374 B1 | | 4/2019 | |
| WO | WO-2010086988 A1 | * | 8/2010 | ............ B23B 51/02 |
| WO | WO-2014069179 A1 | * | 5/2014 | ............ B23B 51/02 |
| WO | 2014/136575 A1 | | 9/2014 | |
| WO | WO-2019021785 A1 | * | 1/2019 | ............ B23B 51/00 |
| WO | WO-2019049257 A1 | * | 3/2019 | ............ B23B 51/02 |

* cited by examiner

FIG. 5 rotation locus of the first margin portions : solid line
rotation locus of the second margin portions : dashed line

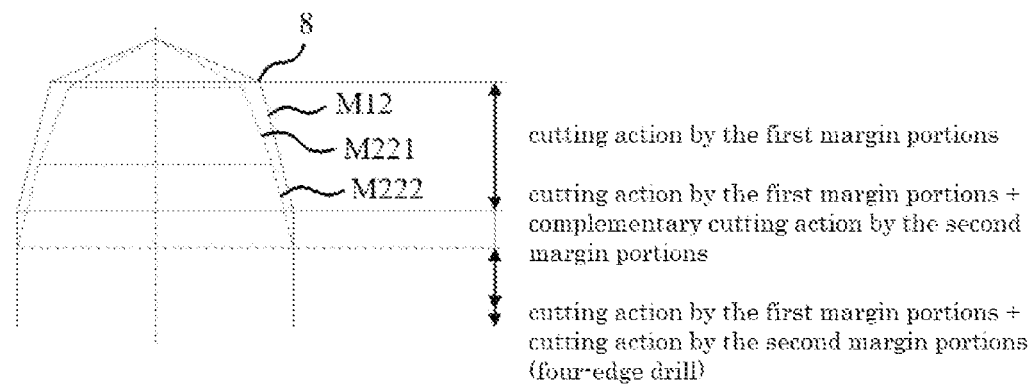

cutting action by the first margin portions cutting action by the first margin portions + complementary cutting action by the second margin portions cutting action by the first margin portions + cutting action by the second margin portions (four-edge drill)

FIG. 6A

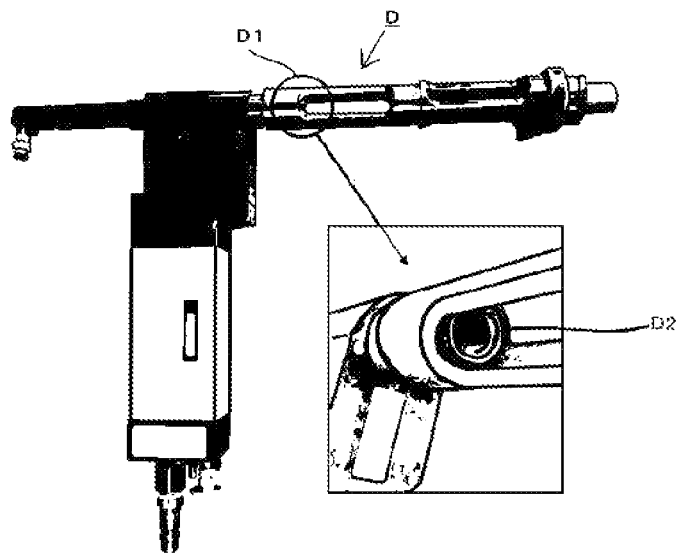

FIG. 6B

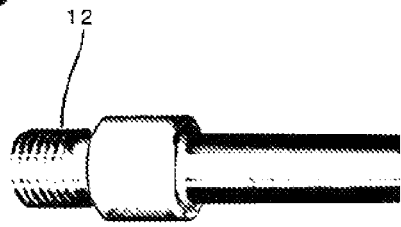

DRILL FOR CARBON-FIBER COMPOSITE MATERIAL

FIELD OF THE INVENTION

The present invention relates to a drill for a carbon fiber composite material, and more specifically, a drill for a carbon fiber composite material that is less likely to cause defects in the carbon fiber composite material, such as burrs, delaminations (inter-layer peeling phenomena), carbon fiber splinters, or mounds around the hole after drilling.

BACKGROUND OF THE INVENTION

In recent years, with respect to drills used for machine tools such as machining centers, the fully automatic type that allows machining without human labor is becoming the mainstream, and thus a number of drills that can be applied to the fully automatic type have been developed and marketed.

On the other hand, with respect to drills used for devices that require force exerted by the operator upon drilling holes, such as hand drills or drill presses, no drill has been actively researched or developed, and thus drills with similar configurations have been used over several decades.

Since drills used for hand drills, drill presses or the like utilize force exerted by the operator's arm to drill holes, it is difficult to drill holes when cutting resistance is high.

However, manufacturers of drills have spent little time on research for decreasing cutting resistance, since they thought that strength and stiffness should be ensured first for these drills themselves, and in practice, operators who bought these drills would grind the drills to use them as they desired.

The present applicant has proposed a drill that is preferably used for peeling spot welding of a vehicle body made of high hardness steel plate in the following Japanese Unexamined Patent Application Publication No. 2006-088267.

This drill has two cutting edges that are symmetrical around the rotation axis and are thinned at the forward end so that the chisel width is from 0.05 mm to 0.3 mm and the web is subject to thinning at an angle from 1° to 4° toward the straight line that connects between the tips of the two cutting edges when viewed from the side of the drill forward end.

According to this drill, the chisel width is narrow and the web is subject to be thinning at an inclination angle from 1° to 4°, which results in lower thrust resistance and requires less force applied by the operator at the time of cutting.

However, in order to utilize this drill for high hardness steel plate, the rake angle formed by thinning is set to be greater than 90°.

For this reason, this drill has a low cutting ability at the center portion, and requires significant force when the center to the outer peripheral edges of the drill reach the workpiece during the operation of drilling a hole with a hand drill.

Further, the forward end of the drill is likely to be chipped at the time of using since the chisel width is very narrow, and in particular, the forward end of a drill made of powder high-speed steel as a raw material is fragile and is even more likely to be chipped.

Hence, the present applicant has proposed a drill that can significantly decrease cutting resistance and can facilitate the operation of drilling a hole with a hand drill, a drill press, or the like using the force exerted by the operator in the following Japanese Unexamined Patent Application Publication No. 2012-192514.

This drill has two cutting edges which are symmetrical around the rotation axis and are thinned at the forward end so that the rake angle $\theta_1$ formed by each main cutting edge and the rake angle $\theta_2$ formed by each thinned cutting edge satisfy $\theta_1 > \theta_2 > 0°$, except directly below the chisel.

SUMMARY OF THE INVENTION

Problems to be Solved by the Invention

In a drill (101) described in Japanese Unexamined Patent Application Publication No. 2012-192514, the rake angle changes when the main cutting edges (104) take over the cutting action at the time of cutting, which thinned cutting edges (103) have started. While the rake is gentle, stable cutting is provided. However, as soon as the inner edge portions (105) of the main cutting edges (104) take over the cutting action, the rake angle rapidly increases, and as the drill outer periphery starts taking over the cutting action, the rake angle further increases and eventually, in the outer periphery (106), the rake angle becomes the same as the helix angle (see FIG. 7).

As a result, oftentimes there have been problems of the generation of cracks in the inner periphery of the hole that is being drilled in the drilled workpiece, such as a carbon fiber composite material, as well as the deformation of the drilled workpiece.

In a case of a laminated drilled workpiece such as, for example, a carbon fiber composite material, there have been problems of the generations of burrs, delaminations (inter-layer peeling phenomena), or carbon fiber splinters at the time of forming a through hole when drilling a carbon fiber composite material with a conventional drill as in FIG. 7.

The above problems may occur with a common drill with a helix angle (=rake angle/outer periphery) of 30°, more or less.

Although these phenomena can be solved by making a gentle helix angle in the drill, other problems will occur instead, such as a problem related to chip discharge, and the drill itself may have a lower cutting ability. Thus, these problems cannot be solved merely by making a gentle helix angle.

As a result of earnest consideration, the present inventors have found that the above problems can be solved by providing forward-end small-diameter portions in the first margin portions and the second margin portions of a double margin drill.

The present invention is to solve the problems of the prior arts as described above, and a drill for a carbon fiber composite material has been successfully developed that does not have a disadvantage like the conventional examples that cause defects in the carbon fiber composite material, such as burrs, delaminations (inter-layer peeling phenomena), carbon fiber splinters, or mounds around the hole after drilling when drilling with two or four edges.

It should be understood that the present invention is an improved version of the "drill for a carbon fiber composite material" in Japanese Patent Application No. 2018-175468 which has already been filed by the present inventors.

Means for Solving the Problems

The invention according to a first aspect relates to a drill for a carbon fiber composite material: having two cutting edges formed symmetrically around a rotation axis, each of the two cutting edges having a main cutting edge formed from a drill forward end toward the side of a drill outer periphery and a thinned cutting edge formed at the side of the drill forward end than the main cutting edge, wherein the drill for a carbon fiber composite material has two relief surfaces formed symmetrically around the rotation axis, wherein back grooves are formed from the relief surfaces toward the drill outer periphery such that first margin portions and second margin portions at the heel side of the first margin portions are formed, wherein the first margin portions have a first forward-end small-diameter portion with a diameter smaller than the drill diameter, that is formed from the side of the drill forward end toward the side of the drill rearward end, wherein the second margin portions have a second forward-end small-diameter portion with a diameter smaller than the first forward-end small-diameter portion, that is formed from the side of the drill forward end toward the side of the drill rearward end, wherein the first forward-end small-diameter portion and the second forward-end small-diameter portion have inclination portions, the diameters of which gradually increase from the side of the drill forward end toward the side of the drill rearward end, and wherein the inclination portions of the first forward-end small-diameter portion have relief surfaces.

The invention according to a second aspect relates to the drill for a carbon fiber composite material according to the first aspect, wherein the inclination portions of the second forward-end small-diameter portion have first inclination portions and second inclination portions, each having a different inclination angle, respectively, wherein the first inclination portions are formed from the side of the drill forward end in the direction toward the side of the drill rearward end and have an inclination angle greater than the inclination angle of each inclination portion of the first forward-end small-diameter portion, and wherein the second inclination portions are formed from the ends of the first inclination portions at the side of the drill rearward end in the direction toward the side of the drill rearward end and have an inclination angle identical to the inclination angle of each inclination portion of the first forward-end small-diameter portion.

The invention according to a third aspect relates to the drill for a carbon fiber composite material according to the second aspect, wherein the diameter between the ends of the second inclination portions at the side of the drill forward end is smaller than the diameter between the first margin portions at the same location in the drill longitudinal direction.

The invention according to a fourth aspect relates to the drill for a carbon fiber composite material according to the second or third aspect, wherein the second inclination portions have relief surfaces.

The invention according to a fifth aspect relates to the drill for a carbon fiber composite material according to the fourth aspect, wherein the inclination portions of the first forward-end small-diameter portion have a relief angle from 5° to 10°, and wherein the second inclination portions have a relief angle from 0.5° to 1.5°.

The invention according to a sixth aspect relates to the drill for a carbon fiber composite material according to any one of the first to fifth aspects, wherein one or more outer peripheral grooves are formed in the first margin portions.

The invention according to a seventh aspect relates to the drill for a carbon fiber composite material according to the sixth aspect, wherein the one or more outer peripheral grooves provided in the two first margin portions that are formed symmetrically around the rotation axis are provided alternately relative to the drill longitudinal direction.

Effects of the Invention

According to the invention of the first aspect, a drill for a carbon fiber composite material has two cutting edges formed symmetrically around the rotation axis, each of the two cutting edges having a main cutting edge formed from a drill forward end toward the side of a drill outer periphery and a thinned cutting edge formed at the side of the drill forward end than the main cutting edge, wherein the drill for a carbon fiber composite material has two relief surfaces formed symmetrically around the rotation axis, wherein back grooves are formed from the relief surfaces toward the drill outer periphery such that first margin portions and second margin portions at the heel side of the first margin portions are formed, wherein the first margin portions have a first forward-end small-diameter portion with a diameter smaller than the drill diameter, that is formed from the side of the drill forward end toward the drill rearward end, wherein the second margin portions have a second forward-end small-diameter portion with a diameter smaller than the first forward-end small-diameter portion, that is formed from the side of the drill forward end toward the side of the drill rearward end, wherein the first forward-end small-diameter portion and the second forward-end small-diameter portion have inclination portions, the diameters of which gradually increase from the side of the drill forward end toward the side of the drill rearward end, and wherein the inclination portions of the first forward-end small-diameter portion have relief surfaces, so that the tips of the inclination portions of the first forward-end small-diameter portion to the drill diameter are formed to be sharp (like outer peripheral edges of an end mill) and can provide a neat cut without dragging carbon fibers at the time of drilling.

Further, the drill is provided with the first forward-end small-diameter portion and the second forward-end small-diameter portion with a diameter smaller than the diameter of the first forward-end small-diameter portion, both of which are provided with inclination portions, so that, at the time of drilling, the main cutting edges to the inclination portions of the first forward-end small-diameter portion are used for drilling until the hole diameter becomes as large as the drill diameter, and the cutting edges of the second margin portions act as a four-edge double margin drill immediately after the hole diameter becomes as large as the drill diameter. Accordingly, enlarging the hole with the two edges and, after enlarging the hole, drilling with the four edges allows the drill to neatly cut the cut surface of the hole as well as the carbon fibers.

Through this series of operations, defects in the carbon fiber composite material after drilling, such as burrs, delaminations (inter-layer peeling phenomena), carbon fiber splinters, or mounds around holes, can be solved.

Furthermore, a drill is provided that can significantly decrease cutting resistance not only when cutting steel-based materials such as stainless steel, but also when cutting thin plates, soft materials, and carbon fiber composite materials, and can facilitate the operation of drilling a hole with a hand drill, a manual drill press, or the like. Further, the decrease in cutting resistance leads to improved accuracy in drilling a hole as well as reduced time required for drilling a hole, which results in improved operation efficiency. Furthermore, the decrease in cutting resistance can lead to a significant extension of life of the drill.

According to the invention of the second aspect, the inclination portions of the second forward-end small-diameter portion has first inclination portions and a second inclination portions, each having a different inclination angle, respectively, the first inclination portions are formed from the side of the drill forward end in the direction toward the side of the drill rearward end and have an inclination angle greater than the inclination angle of the inclination portions of the first forward-end small-diameter portion, and the second inclination portions are formed from the ends of the first inclination portions at the side of the drill rearward end in the direction toward the side of the drill rearward end and have an inclination angle identical to the inclination angle of the inclination portions of the first forward-end small-diameter portion, which results in improved cutting ability of the second forward-end small-diameter portion, providing smoother drilling.

The inclination angle of the first inclination portions is greater than the inclination angle of the inclination portions of the first forward-end small-diameter portion, so that the second margin portions are not at all involved in the cutting action and only the first margin portions are used for cutting when cutting with the side of the drill forward end to the middle in the direction toward the side of the drill rearward end.

The inclination angle of the second inclination portions is identical to the inclination angle of the inclination portions of the first forward-end small-diameter portion, so that the diameter of the second forward-end small-diameter portion with the second inclination portions is slightly smaller than the first margin portions.

The internal diameter of the hole in the carbon fiber composite material cut by the inclination portions of the first forward-end small-diameter portion will slightly shrink due to the shrinkage phenomenon, so that the second inclination portions of the second forward-end small-diameter portion can be used for additional cutting.

This can more easily prevent the generation of a rough internal surface of the hole as well as burrs, delaminations, and the like.

According to the invention of the third aspect, the diameter between the ends of the second inclination portions at the side of the drill forward end is smaller than the diameter between the first margin portions at the same location in the drill longitudinal direction, and the internal diameter of the hole in the carbon fiber composite material cut by the inclination portions of the first forward-end small-diameter portion will slightly shrink due to the shrinkage phenomenon, so that the second inclination portions of the second margin portions can be used for additional cutting.

This can more easily prevent the generation of a rough internal surface of the hole as well as burrs, delaminations, and the like.

According to the invention of the fourth aspect, the second inclination portions have relief surfaces, which results in improved cutting ability of the drill after the hole diameter becomes as large as the drill diameter at the time of drilling, providing smoother drilling in the carbon fiber composite material.

According to the invention of the fifth aspect, the inclination portions of the first forward-end small-diameter have a relief angle from 5° to 10°, and the second inclination portions have a relief angle from 0.5° to 1.5°, so that the cutting edges from the inclination portions of the first forward-end small-diameter to the outer periphery with a diameter corresponding to the drill diameter can be made sharp, creating a tip that can easily cut carbon fibers with a small diameter and interlayer films with a small thickness.

Further, the second inclination portions of the second forward-end small-diameter portion enable easier, additional cutting.

According to the invention of the sixth aspect, one or more outer peripheral grooves are formed in the first margin portions, so that the inclination portions of the second margin portions are located behind the outer peripheral grooves of the first margin portions, and the inclination portions of the second margin portions can complementarily cut parts of the carbon fibers that have not been brought into contact with the cutting edges due to the outer peripheral grooves, providing smoother drilling in the carbon fiber composite material.

Further, the cutting edges intermittently touch the carbon fibers, so that the drill can provide a cut without dragging carbon fibers by the cutting edges and prevent the generation of uncut fibers.

In addition, this can suppress the heat generation at the time of cutting, which leads to the prevention of the deformation of the machined hole as well the denaturation of the material of the drilled workpiece due to the heat generation at the time of cutting.

According to the invention of the seventh aspect, one or more outer peripheral grooves provided in the two first margin portions that are formed symmetrically around the rotation axis are provided alternately relative to the drill longitudinal direction, providing smoother drilling in the carbon fiber composite material.

Further, the cutting edges intermittently touch the carbon fibers, so that the drill can provide a cut without dragging carbon fibers by the cutting edges and prevent the generation of uncut fibers.

In addition, this can suppress the heat generation at the time of cutting, which leads to the prevention of the deformation of the machined hole as well the denaturation of the material of the drilled workpiece due to the heat generation at the time of cutting.

BRIEF DESCRIPTION OF DRAWINGS

FIG. 5 is an explanatory figure illustrating the rotation locus of the drill for a carbon fiber composite material according to the second embodiment.

FIG. 6A illustrates an example positive feed drill used for manufacturing aircraft to which a drill for a carbon fiber composite material is to be attached, where FIG. 6A is a side view of the positive feed drill with an enlarged view of the attachment portion.

FIG. 6B illustrates an example positive feed drill used for manufacturing aircraft to which a drill for a carbon fiber composite material is to be attached, where a FIG. 6B is an enlarged view of the shank of the drill to be attached to the positive feed drill.

DETAILED DESCRIPTION OF THE INVENTION

Preferred embodiments of a drill for a carbon fiber composite material according to the present invention are described below with reference to the accompanying drawings.

First Embodiment

Figure 1:
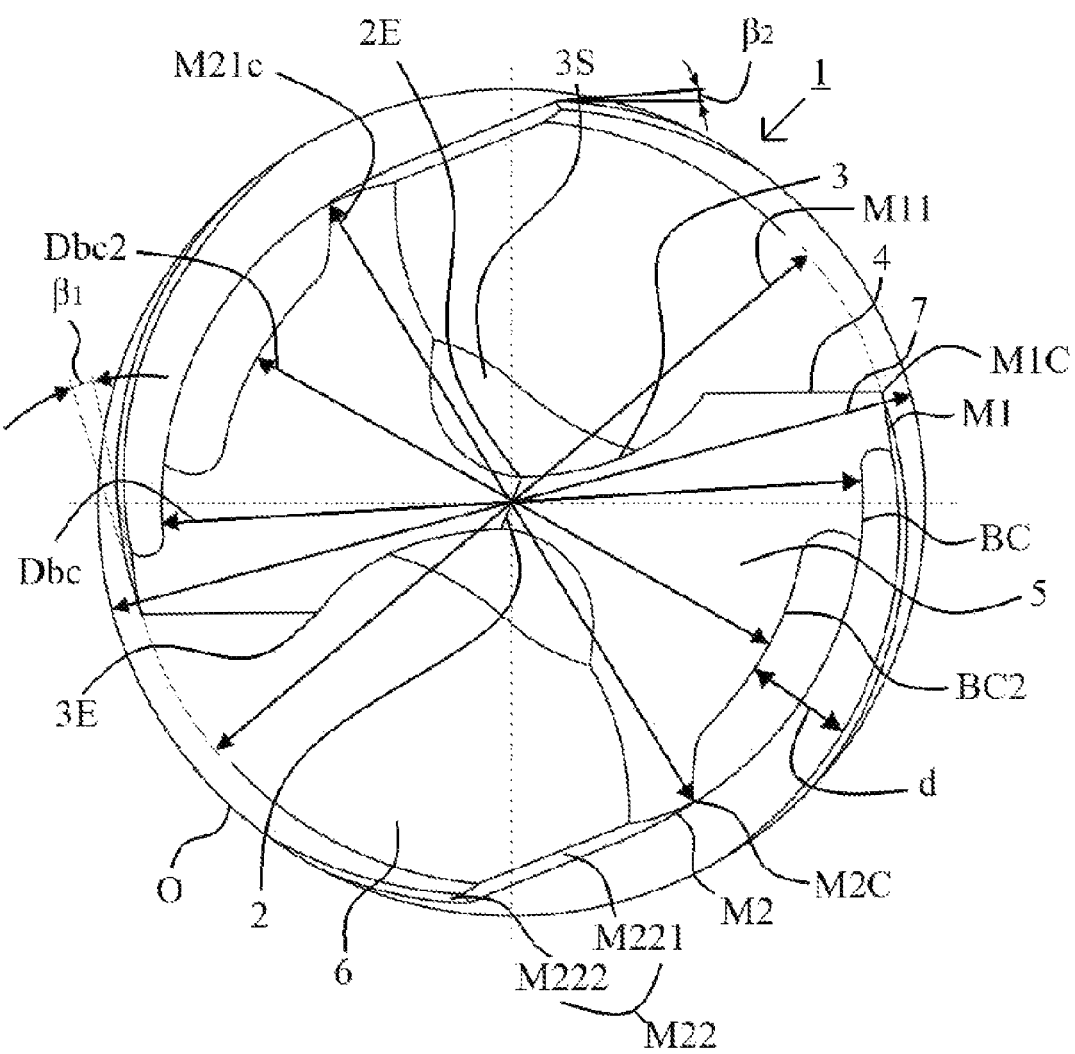
FIG. 1 is a plan view of a drill for a carbon fiber composite material according to a first embodiment (a view when the drill is viewed from the side of the forward end).
Figure 2:
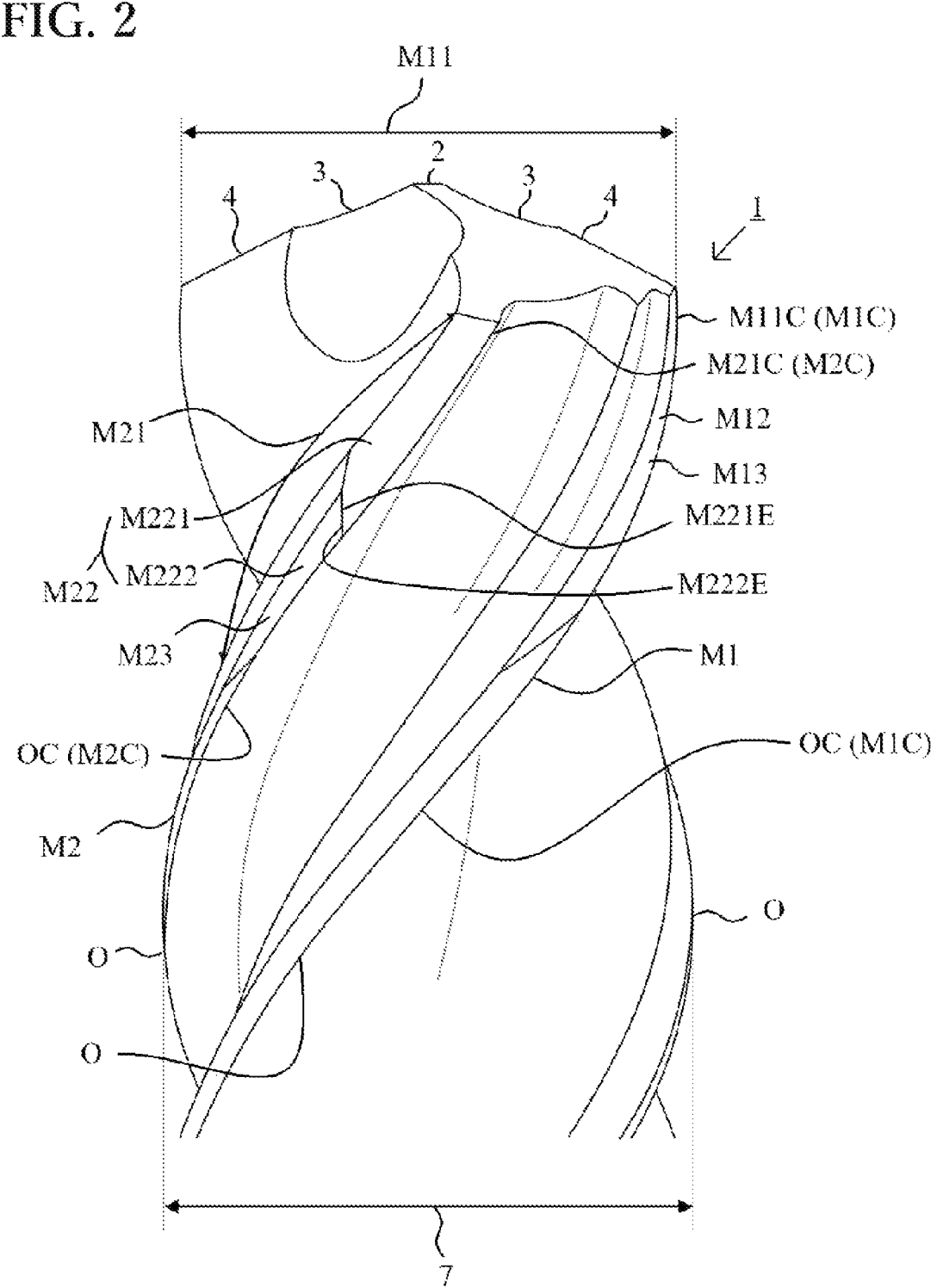
FIG. 2 is a front view of the drill for a carbon fiber composite material according to the first embodiment.

FIG. 1 is a plan view of a drill for a carbon fiber composite material according to the first embodiment (a view when the drill is viewed from the side of the forward end), and FIG. 2 is a front view of the drill for a carbon fiber composite material according to the first embodiment.

The drill for a carbon fiber composite material according to the first embodiment (1) (hereafter, simply referred to as drill (1)) has a substantially cylindrical shape with a diameter $\phi$ having a central axis in the vertical direction.

The material constituting the drill (1) includes JIS SKH40 (powder high-speed steel) and cemented carbide. The drill (1) preferably has a hardness of HRC 66 to HRC 68 if it is made of JIS SKH40, and a hardness of HRA 90 to HRA 94 if it is made of cemented carbide.

As shown in FIG. 1, the drill (1) has two cutting edges that are formed symmetrically around the rotation axis in its upper half (the side of the drill forward end), and two thinned surfaces are formed at the drill forward end such that they have a substantially U-shape when viewed from the side of the drill forward end.

It should be understood that thinning refers to grinding such that a cutting edge is formed in the web of the drill. The cutting edges can be formed as a negative rake angle by thinning the chisel to slightly reduce the web thickness.

It should be understood that in FIG. 1, the thinned surfaces have a substantially U-shape when viewed from the side of the drill forward end; however, the thinned surfaces may have any shape as long as they can form thinned cutting edges (3) mentioned later.

The lower half (the side of the drill rearward end) of the drill (1) is formed such that the drill (1) can be attached to and detached from a hand drill, a drill press or the like.

Further, the drill (1) has a configuration that is decided according to the intended use, e.g., the drill (1) may be threaded to be attached to a positive feed drill (D) used for manufacturing aircraft (See FIGS. 6A and 6B).

FIGS. 6A and 6B are figures illustrating an example of a positive feed drill (D) used for manufacturing aircraft to which a drill (1) according to the present invention is to be attached, where FIG. 6A is a side view of the positive feed drill (D) with an enlarged view of the attachment portion (D1), and FIG. 6B is an enlarged view of the shank (12) of the drill to be attached to the positive feed drill (D).

It should be understood that as shown in FIG. 6A, the positive feed drill (D) is provided with a female thread (D2) in the attachment portion (D1).

The point angle of the drill (1) is set in a range approximately from 90° to 140°.

Each of the two cutting edges consists of a thinned cutting edge (3) extending from the chisel edge (2E) of a chisel (2) formed at the center portion of the drill toward the side of the drill outer periphery in a shape including a curve line or in a straight line shape, and a main cutting edge (4) extending from the end (3E) of the thinned cutting edge (3) in the direction toward the drill outer periphery, when viewed from the side of the drill forward end.

It should be understood that in the illustrated example, each main cutting edge (4) extends in a straight line shape in the direction toward the drill outer periphery when viewed from the side of the drill forward end; however, it may extend in a curved line shape or it may extend in a linear shape including a straight line portion and a curved line portion. This is in common with all embodiments of the present invention.

Each main cutting edge (4) is formed to have a rake angle $\theta_1$ relative to the vertical direction.

It should be understood that the numeral (5) in FIG. 1 represents a relief surface of a main cutting edge.

Preferably, the chisel width (2W) of the chisel (2) is set so as to provide an easy cut in the drilled workpiece even in a case of a drill pressed against the drilled workpiece with a hand drill or the like using the force exerted by the operator as well as it is set so as to ensure strength while maintaining cutting ability, anticipating the use of the drill with a positive feed drill (D), a machining center for a machining process, or the like.

Specifically, the chisel width (2W) is preferably set from about 5% to about 20% of the drill diameter $\phi$.

For example, if the drill diameter $\phi$ is from 2 mm to 13 mm, the chisel width (2W) is increased or decreased and set in a range from 0.05 mm to 2.6 mm depending on the increase or decrease of the drill diameter.

In the drill (1) according to the first embodiment, the helix angle $\delta$ of each of the main cutting edges (4) is set to satisfy the range from 25° to 50° relative to the vertical direction, more preferably, it is set to 40°.

Setting the helix angle $\delta$ below 25° or beyond 50° is not preferable for if the helix angle $\delta$ is set below 25°, the cutting edges become dull, and if helix angle $\delta$ is set beyond 50°, the cutting edges lack strength and have difficulty in discharging chips.

If the helix angle $\delta$ is set to satisfy the range from 25° to 50°, sharp cutting edges are made, which results in improved cutting ability.

Thus, preferably, the helix angle $\delta$ is set to 40°, more or less.

Preferably, each thinned cutting edge (3) is provided with an inclination along the helix direction of the chip discharge groove (6).

Each thinned surface (3S) at the drill forward end has a substantially U-shape when viewed from the side of the drill forward end and has an inclination angle $3\gamma$ relative to the vertical direction of the thinned surface (3S), which satisfies $\delta < 3\gamma$. In addition, preferably, the inclination angle $3\gamma$ of the thinned surface (3S) is set in a range from 15° to 50° (for example, 35°).

Moreover, each thinned cutting edge (3) is formed to have a rake angle $\theta_2$ relative to the vertical direction.

In the drill (1) according to the first embodiment, preferably, the rake angle $\theta_2$ of each thinned cutting edge (3) is set to be greater than 0° and smaller than the rake angle $\theta_1$ of each main cutting edge (4).

That is, these rake angles have a relationship of $\theta_1 > \theta_2 > 0°$.

However, these rake angles have a relationship of $\theta_2 \approx 0°$ ($\theta_2 < 0°$, $\theta_2$ being substantially close to 0°) only directly below the chisel (2).

Further, preferably, the point angle $\alpha_1$ formed by each main cutting edge (4) and the point angle $\alpha_2$ formed by each thinned cutting edge (3) satisfy $\alpha_1 < \alpha_2 < 90°$.

Each of the relief surfaces (5) has a relief angle $\beta$ relative to the horizontal surface and, preferably, the relief angle $\beta$ is set to satisfy $0°<\beta<30°$. It should be understood that there is an appropriate angle for the relief angle $\beta$ depending on the point angle, and preferably, the relief angle $\beta$ is set close to 0° (for example, 3°) if the point angle is close to 90°, and is set close to 30° (for example, 25°) if the point angle is close to 140°.

The drill (1) according to the first embodiment has two relief surfaces (5) formed symmetrically around the rotation axis, and each of the two relief surfaces (5) has back grooves (BC) formed in a shape including a curve line or in a straight line shape toward the drill outer periphery (O) when viewed from the side of the drill forward end.

Therefore, the drill outer periphery (O) has a double margin configuration (a configuration with first margin portions (M1) and second margin portions (M2)), and the first margin portions (M1) and the second margin portions (M2) located at the heel side thereof are both provided with cutting edges (cutting edges (M1C) of the first margin portions and cutting edges (M2C) of the second margin portions), thereby the drill substantially has a four-edge configuration.

As the drilling action proceeds, these four edges are used for drilling after the hole diameter becomes as large as the drill diameter (7), which can prevent the generation of delaminations at the time of drilling in the carbon fiber composite material.

The first margin portions (M1) and the second margin portions (M2) have a helix angle from 25° to 50° along the drill outer periphery. Therefore, the cutting edges (M1C) of the first margin portions and the cutting edges (M2C) of the second margin portions have a rake angle formed by the respective helix angle, thereby the drill has a four-edge configuration.

As shown in FIG. 2, the first margin portions (M1) have a first forward-end small-diameter portion (M11) with a diameter smaller than the drill diameter (7), that is formed from the side of the drill forward end toward the side of the drill rearward end (that is, formed to extend from the upper half of the drill to the lower half of the drill).

The first forward-end small-diameter portion (M11) has inclination portions (M12), the diameter between which gradually increases from the side of the drill forward end toward the side of the drill rearward end.

The inclination portions (M12) have relief surfaces (M13).

That is, the first forward-end small-diameter portion (M11) connected from the main cutting edges (4) is provided with relief like outer peripheral edges of an end mill such that the tips are formed to be sharp so that they can neatly cut carbon fibers at the time of drilling. The first margin portions (M1) excluding the inclination portions (M12) have a shape along the outer periphery like a common drill.

In the drill (1) according to the first embodiment, sharp cutting edges are made by grinding the first margin portions (M1) from the side of the drill forward end toward the side of the drill rearward end and making the diameter smaller than the drill diameter (7).

Part of the first margin portions (M1) that has a diameter smaller than the drill diameter (7) is referred to as first forward-end small-diameter portion (M11).

It should be understood that part that is at the side of the drill rearward end than the first forward-end small-diameter portion (M11) and has a drill diameter (7) is referred to as drill outer periphery (O).

The cutting edge (M1C) of each first margin portion is divided into a cutting edge (M11C) of the first forward-end small-diameter portion, which is located in the first forward-end small-diameter portion (M11), and a cutting edge (OC) of the outer periphery, which is located in the drill outer periphery (O).

Preferably, the first forward-end small-diameter portion (M11) has a diameter (a diameter at the side of the drill forward end) as large as 90% to 95% of the drill diameter (7).

For example, preferably, the first forward-end small-diameter portion (M11) has a diameter from 2.7 mm to 2.85 mm if the drill diameter (7) is 3 mm, the forward-end small-diameter portion (8) has a diameter from 5.4 mm to 5.7 mm if the drill diameter (7) is 6 mm, and the first forward-end small-diameter portion (M11) has a diameter from 13.5 mm to 14.25 mm if the drill diameter (7) is 15 mm By setting the diameter of the first forward-end small-diameter portion (M11) in the above range, the cutting action by the first forward-end small-diameter portion (M11) is gradually shifted to the smooth hole expanding action by the inclination portions (M12) at the time of drilling, which can more easily prevent defects in the carbon fiber composite material after drilling, such as burrs, delaminations (inter-layer peeling phenomena), carbon fiber splinters, or mounds around the hole.

The first forward-end small-diameter portion (M11) has inclination portions (M12), the diameter between which gradually increases from the side of the drill forward end toward the side of the drill rearward end.

By providing the inclination portions (M12), the drill forward end with the smallest diameter is used first for drilling at the time of drilling in the carbon fiber composite material, and then, as the drilling action proceeds, the inclination portions (M12), the diameter between which gradually increases, are used for expanding the diameter of the hole, and then, for the first time, the four edges are used for cutting after the drill outer periphery (O) reaches to the hole.

The drill drills slowly in a stepwise manner in the carbon fiber composite material as compared to drilling with the four edges from the beginning, which can more easily prevent defects in the carbon fiber composite material after drilling, such as burrs, delaminations (inter-layer peeling phenomena), carbon fiber splinters, or mounds around the hole.

It should be understood that, although not particularly limited, preferably, the inclination portions (M12) have an inclination angle from 2.5° to 4°, and most preferably 3°. If the inclination angle of the inclination portions (M12) is below 2.5°, cutting ability decreases, and if the inclination angle of the inclination portions (M12) is beyond 4°, cutting resistance increases and a load is placed on the tip of the edges, and thus these angles are not preferable.

Further, although not particularly limited, preferably, the relief angle (PO of the first forward-end small-diameter portion (M11) in the outer peripheral direction is from 5° to 10°, and most preferably, 8°. Therefore, sharp cutting edges of the outer periphery can be formed from the first forward-end small-diameter portion (M11) to the inclination portions (M12).

If the relief angle ($\beta_1$) of the first forward-end small-diameter portion (M11) in the outer peripheral direction is below 5°, cutting ability decreases, and if the relief angle ($\beta_1$) of the first forward-end small-diameter portion (M11) in the outer peripheral direction is beyond 10°, cutting resistance increases and a load is placed on the tip of the edges, and thus these angles are not preferable.

The second margin portions (M2) have a second forward-end small-diameter portion (M21) with a diameter smaller than the drill diameter (7) and the first forward-end small-diameter portion (M11), that is formed from the side of the drill forward end toward the side of the drill rearward end (that is, formed to extend from the upper half of the drill to the lower half of the drill).

The second forward-end small-diameter portion (M21) has inclination portions (M22), the diameter between which gradually increases from the side of the drill forward end toward the side of the drill rearward end.

In the drill (1) according to the first embodiment, sharp cutting edges are made by grinding the second margin portions (M2) from the side of the drill forward end toward the side of the drill rearward end and making the diameter smaller than the drill diameter (7).

Part of the second margin portions (M2) that has a diameter smaller than the drill diameter (7) is referred to as second forward-end small-diameter portion (M21).

It should be understood that part that is at the side of the drill rearward end than the second forward-end small-diameter portion (M21) and has a drill diameter (7) is referred to as drill outer periphery (O).

The cutting edge (M2C) of each second margin portion is divided into a cutting edge (M21C) of the second forward-end small-diameter portion, which is located in the second forward-end small-diameter portion (M21), and a cutting edge (OC) of the outer periphery, which is located in the drill outer periphery (O).

Preferably, the second forward-end small-diameter portion (M21) has a diameter (M21c) (a diameter at the side of the drill forward end) so small that that no damage is caused to the cutting action by the first margin portions (M1), and preferably, the diameter (M21c) is set greater than or equal to 75% of the drill diameter (7) and in the range approximately from the diameter (Dbc) of back grooves (BC) to the diameter (Dbc2) of second back grooves (BC2).

By setting the diameter (M21c) of the second forward-end small-diameter portion (M21) in the above range, the second margin portions (M2) are not involved in the hole expanding action from the start of drilling until drilling a hole as large as the drill diameter, and only the inclination portions (M12) of the first forward-end small-diameter portion (M11) are used for gradually and smoothly expanding the hole diameter, and then the four edges of the first margin portions (M1) and the second margin portions (M2) are used for drilling, which can provide smooth drilling and more easily prevent defects in the carbon fiber composite material after drilling, such as burrs, delaminations (inter-layer peeling phenomena), carbon fiber splinters, or mounds around the hole.

The second forward-end small-diameter portion (M21) has inclination portions (M22), the diameter between which gradually increases from the side of the drill forward end toward the side of the drill rearward end.

The inclination portions (M22) may have first inclination portions (M221) and second inclination portions (M222), each having a different inclination angle, respectively.

The second inclination portions (M222) have relief surfaces (M23).

By providing the relief surfaces (M23), the drill can easily discharge chips and have improved cutting ability.

Preferably, the relief angle ($\beta_2$) of the second inclination portions (M222) is from 0.5° to 1.5°.

By setting the relief angle ($\beta_2$) of the second inclination portions (M222) from 0.5° to 1.5°, the second margin portions (M2) can be used for complementing the cutting action after the cutting action by the first margin portions (M1).

If the relief angle ($\beta_2$) of the second inclination portions (M222) is below 0.5°, cutting ability decreases, and if the relief angle ($\beta_2$) of the second inclination portions (M222) is beyond 1.5°, cutting resistance increases and a load is placed on the tip of the edges, and thus, these angles are not preferable.

The first inclination portions (M221) are formed from the side of the drill forward end in the direction toward the side of the drill rearward end and has an inclination angle greater than the inclination angle of the inclination portions (M12) of the first forward-end small-diameter portion (M11).

Accordingly, the first inclination portions (M221) have an inclination angle greater than the inclination angle of the inclination portions (M12) of the first forward-end small-diameter portion (M11), and thus they are not involved in the cutting action.

The inclination angle of the first inclination portions (M221) may be any angle as long as they do not cause damage to the cutting action by the first margin portions (M1).

For example, preferably, the inclination angle of the inclination portions (M12) of the first forward-end small-diameter portion (M11) is from 2.5° to 4°, and thus, the inclination angle of the first inclination portions (M221) may be any angle that is greater than or equal to 4° or greater, preferably from 5° to 20°, and most preferably 10°.

If the inclination angle of the inclination portions (M12) of the first forward-end small-diameter portion (M11) is beyond 20°, the shape of the drill is deformed and the heels are significantly ground, and if the inclination angle is below 4°, they may cause damage to the cutting action by the first margin (M1), and thus these angles are not preferable.

The second inclination portions (M222) are formed from the ends (M221E) of the first inclination portions (M221) at the side of the drill rearward end in the direction toward the side of the drill rearward end and have an inclination angle identical to the inclination angle of the inclination portions (M12) of the first forward-end small-diameter portion (M11).

That is, preferably, the inclination angle of the second inclination portions (M222) is in the range from 2.5° to 4° and is identical to the inclination angle of the inclination portions (M12) of the first forward-end small-diameter portion (M11), and most preferably, it is 3° and is identical to the inclination angle of the inclination portions (M12).

If the inclination angle of the second inclination portions (M222) is below 2.5°, cutting ability decreases, and if the inclination angle of the second inclination portions (M222) is beyond 4°, cutting resistance increases and a load is placed on the tip of the edges, and thus these angles are not preferable.

The inclination angle of the second inclination portions (M222) is identical to the inclination angle of the inclination portions (M12) of the first forward-end small-diameter portion (M11), so that the second inclination portions (M222) can be used for additional cutting for the hole made by the first margin portions (M1).

That is, preferably, the relationship of the inclination angles of the inclination portions is: the inclination angle of the first inclination portions (M221)>the inclination angle of the inclination portions (M12) of the first forward-end small-diameter portion (M11)=the inclination angle of the second inclination portions (M222).

Preferably, the diameter between the ends (M222E) of the second inclination portions (M222) at the side of the drill forward end is smaller than the diameter between the first margin portions (M1) at the same location (height) in the drill longitudinal direction.

Therefore, the inclination angle of the second inclination portions (M222) can be used for additional cutting for the hole made by the first margin portions (M1).

Preferably, the length of the second forward-end small-diameter portion (M21) of the drill (1) is the same as the length of the first forward-end small-diameter portion (M11) or is greater than the length of the first forward-end small-diameter portion (M11).

The specific length of the second forward-end small-diameter portion (M21) is set depending on the braiding technique, the stacking direction, and the like of the carbon fibers of the carbon fiber composite material.

Therefore, at the time of cutting the carbon fiber composite material with the drill (1), the chisel (2) to the thinned cutting edges (3), the main cutting edges (4) and then the first forward-end small-diameter portion (M11) reach the hole, the inclination portions (M12) of the first forward-end small-diameter portion (M11) begin to be used for cutting. Then, the inclination portions (M12) of the first forward-end small-diameter portion (M11) to the drill diameter (7) reach the hole for cutting. When the drill diameter (7) reaches the hole, the drill outer periphery (O) comprising the four cutting edges in total with double margins, the first margin portions (M1) and the second margin portions (M2), and the rake angles (that is, the two cutting edges (M1C) of the first margin portions and the two cutting edges (M2C) of the second margin portions) is used to complete drilling the hole with a diameter of a given size (drill diameter (7)).

That is, the periphery of the cutting edges of the drill forward end portion is made slightly thinner than the drill diameter (7), and after forming a so-called preparatory hole, the inclination portions (M12) are used for gradually expanding the hole diameter and the drill diameter (7) is used for forming the hole, and eventually the four double-margin edges are used to complete drilling with the stable cutting action.

Through this series of operations, defects in the carbon fiber composite material after drilling, such as burrs, delaminations (inter-layer peeling phenomena), carbon fiber splinters, or mounds around holes, can be solved.

For drilling in the carbon fiber composite material, 0.251 inch diameter drill is used for drilling a 0.25 inch hole since hole shrinkage occurs immediately after drilling, and thus drilling a hole with four double-margin edges is effective in forming a hole.

The inclination angle of the second inclination portions (M222) of the second margin portions (M2) is set to be identical to the inclination angle of the first forward-end small-diameter portion (M11).

Further, the inclination angle is set, slightly toward the side of drill diameter as shown in the rotation locus (FIG. 5). This is a result of taking into consideration of the hole shrinkage that occurs in the carbon fiber composite material at the time of cutting.

It should be understood that the drill (1) may be used with a diamond coating for abrasion resistance of the tips of the cutting edges.

Being coated with a diamond coating, the drill (1) becomes a drill with a longer product life, dedicated for a carbon fiber composite material that can operate at a high feed rate and delivers improved hole quality.

In the drill (1), the groove depth (d) of the back grooves (BC) may be deeper than the back grooves (BC) at the side of the first margin portions (M1) such that the back grooves (BC) extend from the side of the second margin portions (M2) to the side of the first margin portions (M1) (See FIG. 1). Hereinafter, parts of the back grooves, the groove depth (d) of which is deeper, are referred to as second back grooves (BC2).

By providing the second back grooves (BC2), the rakes of the cutting edges (OC) of the outer periphery of the second margin portions, which are the last cutting edges, are enhanced (that is, a wider rake angle is formed), which can prevent the generation of uncut fibers (a phenomenon in which the drill cannot completely cut fibers and leave fibers torn off from the circumference of the hole as the drill passes through the through hole) due to strength of the carbon fibers.

Further, in order to more easily produce the above effect, preferably, the second back grooves (BC2) are provided with a length greater than or equal to half the full length of the back grooves (BC) (that is, the distance from the first margin portions (M1) to the second margin portions (M2)).

Preferably, the second forward-end small-diameter portion (M21) of the second margin portions (M2) is made so small that they do not cause damage to the cutting action by the first margin portions (M1). However, if the second forward-end small-diameter portion (M21) is too small and the diameter becomes smaller than the diameter between the back grooves, they will grind the heels, which may cause a problem in terms of strength. Thus, the diameter is set in the range that it does not becomes smaller than the diameter (Dbc2) of the second back grooves (BC2).

The diameter (Dbc2) of the second back grooves (BC2) is set about 70% of the drill diameter (7) in consideration of chip discharge, and the first forward-end small-diameter portion (M11) of the first margin portions (M1) and the second forward-end small-diameter portion (M21) of the second margin portions (M2) are set greater than the diameter (Dbc2) of the second back grooves (BC2).

If the second back grooves (BC2) are provided to prevent uncut fibers, the rakes are enhanced, which may cause a reverse phenomenon due to the rake.

Thus, preferably, relatively large back tapers are provided in the drill periphery to solve the reverse phenomenon due to the rake.

In a regular drill, back tapers of about 0.04/100 (mm) are provided in the drill forward end to the drill rearward end; however, by forming back tapers of 0.4/100 (mm), which are equivalent to 10 times the back tapers of the regular drill (that is, the drill diameter becomes 0.4 mm smaller per 100 mm from the beginning of the back tapers in the direction toward the drill rearward end) and providing these back tapers from the beginning of the outer periphery, the reverse phenomenon due to the rake can be solved.

Second Embodiment

Figure 3:
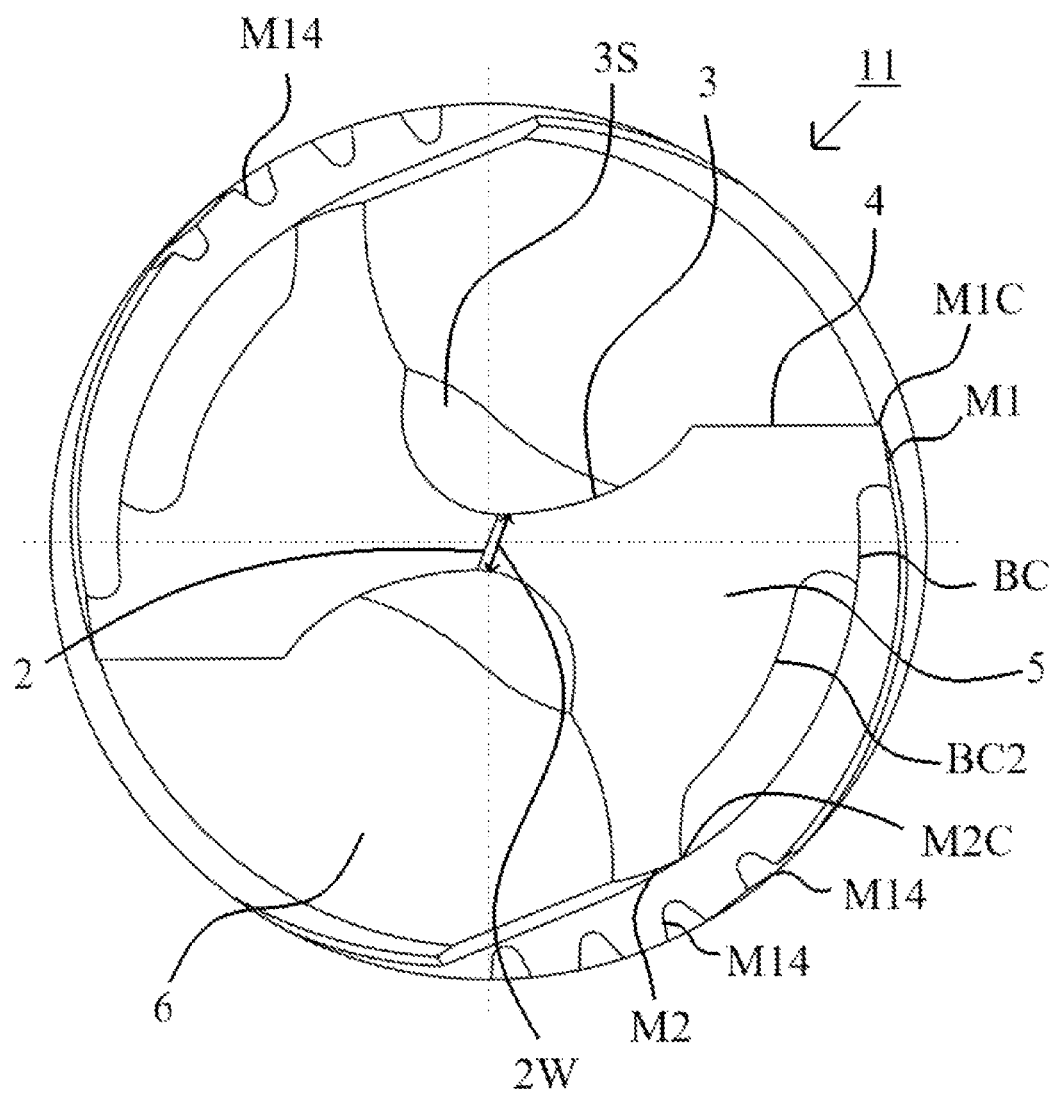
FIG. 3 is a plan view of a drill for a carbon fiber composite material according to a second embodiment (a view when the drill is viewed from the side of the forward end).
Figure 4:
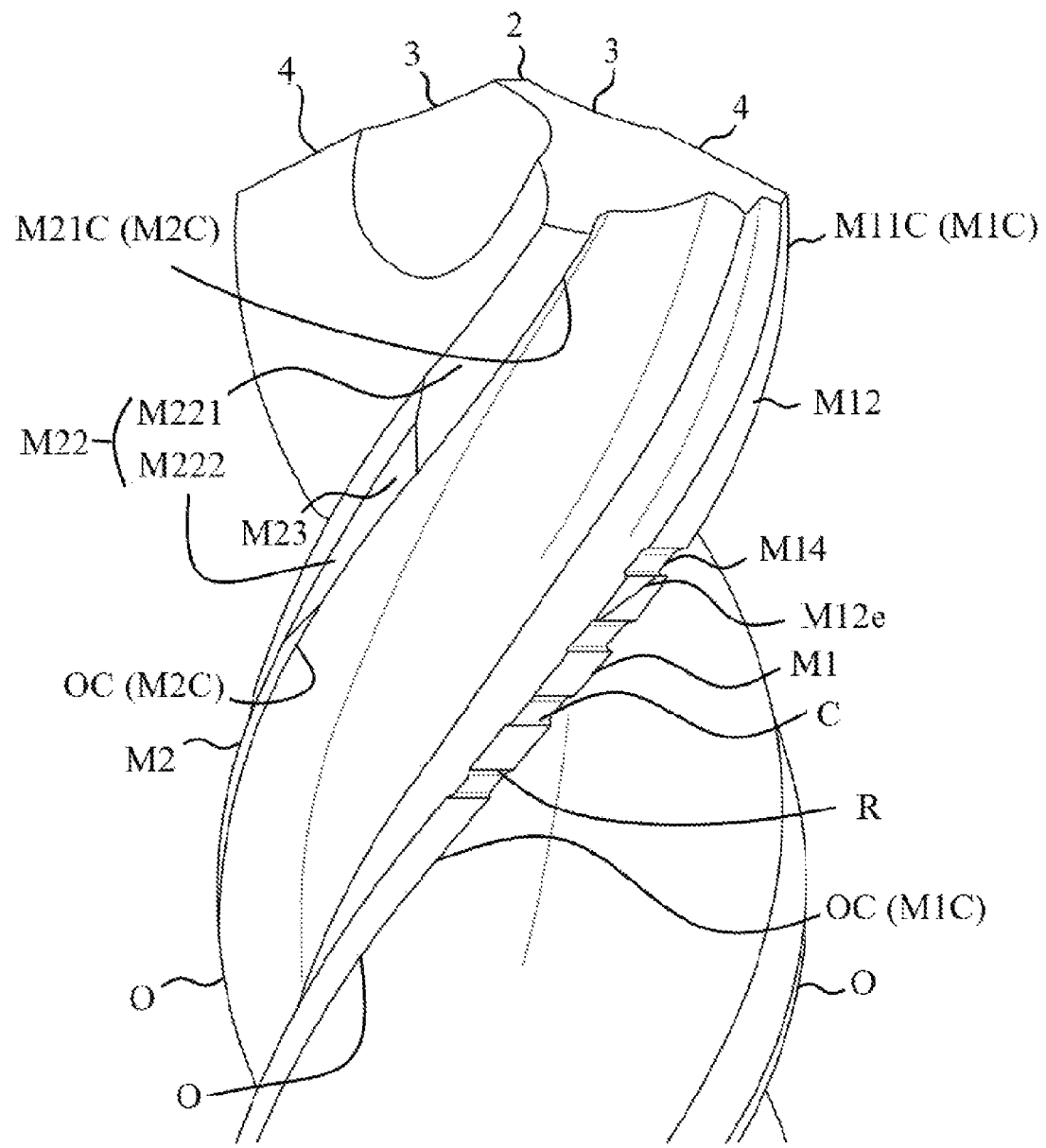
FIG. 4 is a front view of the drill for a carbon fiber composite material according to the second embodiment.
Figure 7:
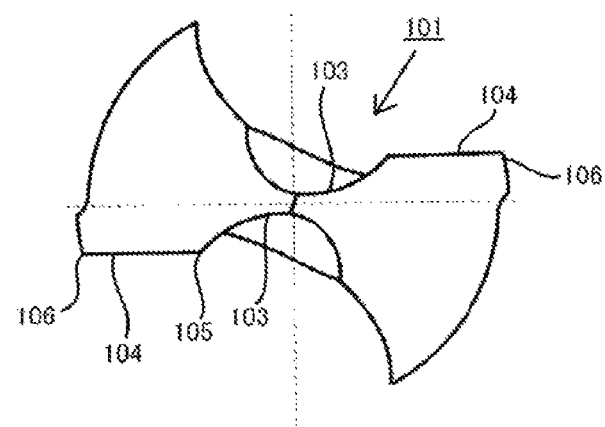
FIG. 7 is a plan view of a conventional drill (a view when the drill is viewed from the side of the forward end).

FIG. 3 is a plan view of the drill for a carbon fiber composite material according to the second embodiment (a view when the drill is viewed from the side of the forward end), FIG. 4 is a front view of the drill for a carbon fiber composite material according to the second embodiment, and FIG. 5 is an explanatory figure illustrating the rotation locus of the drill for a carbon fiber composite material according to the second embodiment.

The drill for a carbon fiber composite material according to the second embodiment (11) (hereinafter, simply referred to as drill (11)) has outer peripheral grooves (M14) in the first margin portions (M1).

It should be understood that the drill for a carbon fiber composite material according to the second embodiment (11) has a similar configuration as the drill according to the first embodiment (1), except that outer peripheral grooves (M14) are provided in the first margin portions (M1).

In the drill (11), outer peripheral grooves (M14) are provided in the inclination portions (M12) of the first forward-end small-diameter portion (M11) of the first margin portions (M1) to the drill outer periphery (O) for the purpose of suppressing the heat generation in the carbon fiber composite material at the time of drilling and providing a more effective cut.

The outer peripheral grooves (M14) are provided in the first margin portions (M1), which can suppress the heat generation in the carbon fiber composite material, which then can prevent the deformation of the machined hole as well the change of the material of the carbon fiber composite material due to the heat generation at the time of drilling.

The location of each groove of the outer peripheral grooves (M14) is not particularly limited: each groove provided in the two first margin portions (M1) each continuing to the two main cutting edges may be arranged at the same location (height) in the drill longitudinal direction, or may be arranged to be staggered (alternated in the height direction), or each groove may be arranged at a different pitch. The position of each groove is determined as appropriate depending on the difference in the material subject to be drilled, the stacked structure of the carbon fibers, and the like.

Preferably, the length of the second forward-end small-diameter portion (M21) of the drill (11) is the same as the length of the first forward-end small-diameter portion (M11) or is greater than the length of the first forward-end small-diameter portion (M11).

The specific length of the second forward-end small-diameter portion (M21) is set depending on the braiding technique, the stacking direction, and the like of the carbon fibers of the carbon fiber composite material.

Therefore, the second forward-end small-diameter portion (M21) can complementarily cut part of the carbon fiber composite material that has not been brought into contact with the cutting edges due to the outer peripheral grooves (M14) at the time of cutting with the first forward-end small-diameter portion (M11) provided with the outer peripheral grooves (M14).

The drill can more neatly cut the carbon fiber composite material without an increase in the temperature if it cuts, gradually transitioning from the use of the first forward-end small-diameter portion (M11) to the use of the four edges (that is, the two edges, and then the two edges (complemented with the two edges of the second forward-end small-diameter portions), and then the four edges) as compared to when it cuts with the four edges immediately after the first forward-end small-diameter portion (M11).

That is, the heat generation suppressing effect by the outer peripheral grooves (M14) and the finishing effect by the sharp cutting edges of the cutting edges (M2C) of the second margin portions without outer peripheral grooves will result in the achievement of a longer product life and the suppression of the generation of delaminations.

That is, by equipping the drill with the above structure, the drill (11) has the rotation locus (8) as shown in FIG. 5.

The first forward-end small-diameter portion (M11) has a smaller rotation locus than the rotation locus of the drill diameter (7), and the second forward-end small-diameter portion (M21) has a smaller rotation locus than the rotation locus of the first forward-end small-diameter portion (M11).

Thus, the main cutting edges to the first margin portions (M1) are used for drilling in this region.

As the side of the drill rearward end advances to the hole, the diameter between the first margin portions (M1) increases due to the inclination portions (M12) and eventually reaches the size of the drill diameter (7). In addition to the cutting action by the first margin portions (M1), the second margin portions (M2) are used for cutting part of the carbon fiber composite material that has been excluded from being cut due to the outer peripheral grooves (M14) provided in the first margin portions (M1) immediately after the diameter between the first margin portions (M1) that arrive at the hole reaches the size of the drill diameter (7).

Then, after the diameter between the second margin portions (M2) that arrive at the hole reaches the size of the drill diameter (7) and the ends of the outer peripheral grooves (M14) of the first margin portions (M1) pass through the hole, the four edges of the first margin portions (M1) and the second margin portions (M2) are used for cutting.

Preferably, the outer peripheral grooves (M14) are provided near the ends (M12e) of the inclination portions (M12) of the first margin portions (M1) alternately with the two first margin portions (M1) each continuing to the two main cutting edges, and one each is provided in the inclination portions (M12) of the first margin portions (M1) and three or more each are provided in the first margin portions (M1).

The two edges+the two edges can be used for cutting, instead of complete four edges, by providing outer peripheral grooves (M14) near the ends (M12e) of the inclination portions (M12) of the first margin portions (M1) alternately as described above, which results in more steadily and neatly cutting the carbon fibers and preventing the generation of uncut fibers.

This is due to the effect that the cutting edges intermittently touch the carbon fibers so that the drill can provide a cut without dragging carbon fibers by the cutting edges, which results in preventing the dragging of fibers at the time of cutting the carbon fibers when the carbon fibers themselves have great strength or the carbon fibers have a thin diameter or the like.

It should be understood that the number of the outer peripheral grooves (M14) of the first margin portions (M1) may be increased or decreased depending on the characteristics of the carbon fiber composite material.

The drill (11) is provided with the outer peripheral grooves (M14) to suppress the heat generation during drilling as described above, so that the drill does not have a high temperature after drilling in a carbon fiber composite material with the drill (11) and it only generates heat to the extent that it can be directly touched by hand. This results in the achievement of a longer product life and the suppression of the generation of delaminations.

Preferably, each groove of the outer peripheral grooves (M14) has a shape such that the side that touches the workpiece is horizontal and the opposite side is inclined.

As a preferable example, if the drill longitudinal direction is considered to be vertical, then the inclination of each groove is from about 30° to about 40° from the horizontal.

However, this inclination is provided for the purpose of preventing the breakage since the cutting edges (M1C) of the first margin portions have insufficient strength due to the outer peripheral grooves (M14), and thus it may be horizontal.

Providing appropriate arcs (R) at the corners (C) of the bottoms of the grooves can prevent the breakage of the drill.

The depth of the outer peripheral grooves (M14) is approximately from 3% to 8% of the drill diameter (7) and is adjusted depending on the drill diameter (7) (For example, the depth is adjusted and set to be smaller when the drill diameter has a relatively large size, and is set to be larger when the drill diameter is small). Further, the depth of the outer peripheral grooves (M14) is set such that the outer peripheral grooves will not interfere with the back grooves (BC), and the depth of each of the outer peripheral grooves (M14) and back grooves (BC) may be set depending on the drill diameter (7), the depth of the drilled hole and the like.

EXAMPLES

Test results of the drill for a carbon fiber composite material according to the present invention are shown below, in order to further clarify the effects of the present invention. However, the present invention is not at all limited to the following example.

A cutting test was conducted using a drill according to the present invention (Example) and a drill according to Japanese Patent No. 6501374 (Comparative Example) for a carbon fiber composite material that is scheduled to be newly employed by a aircraft manufacturer.

The drill according to the above first embodiment was used as an Example.

The detailed configuration is as follows:
Point angle: 120°
Relief angle of the main cutting edge: 10°
Relief angle of each inclination portion of the first forward-end small-diameter portion: 8°
Relief angle of each second inclination portion: 1°
Helix angle: 40°
Diameter of the end of the first forward-end small-diameter portion at the side of the drill forward end: 93% of the drill diameter
Diameter of the end of the second forward-end small-diameter portion at the side of the drill forward end: 80% of the drill diameter (diameter of each back groove is 83% of the drill diameter)
Inclination angle of each inclination portion of the first forward-end small-diameter portion: 3°
Inclination angle of each first inclination portion: 10°
Inclination angle of each second inclination portion: 3°
Drill diameter: 6.357 mm
Material: cemented carbide (with diamond coating) (the same as Comparative Example)

The following drill was used as Comparative Example.
Drill according to the seventh embodiment described in Japanese Patent No. 6501374 (double margin type having main cutting edges, thinned cutting edges, and U-shaped cutting edges and also having outer peripheral grooves)
Drill diameter: 6.357 mm
Material: cemented carbide (with diamond coating) (the same as Example)

The following test was conducted using Example and Comparative Example.

The test method and result of each test are shown as follows.

NC milling machine ON-3VII (OHTORI KIKO CO., LTD.) was used for drilling a hole and cutting at a speed of 6,000 RPM and a feed rate of 456 mm/min (0.076 mm/rev.).

<Test 1. Drilled Hole Dimension Measurement (Front and Back Surfaces of the Through Hole)>

Measuring apparatus: high precision three-dimensional measuring apparatus 2UPMC550CARAT (Carl Zeiss Co., Ltd.)

Evaluation: both Example and Comparative Example were used for drilling a hole 701 times, respectively, and the 1st hole, the 101st hole, the 201st hole, the 301st hole, the 401st hole, the 501st hole, the 601st hole and the 701st hole were evaluated.

Evaluation method: the hole diameter was measured in the inlet side and the outlet side in the drilling direction Evaluation criteria: the hole was evaluated as ○ within the tolerance range when the hole accuracy was within the range of ±0.02 mm, and was evaluated as x out of the tolerance range when the hole accuracy was out of the range of ±0.02 mm Test results were shown in the following Table 1.

As shown in the following Table 1, while the through holes made by the drill of Example were observed to be within the tolerance range when evaluated on the front and back surfaces, the 701st hole made by the drill of Comparative Example was observed to be enlarged out of the tolerance range on the front surface.

TABLE 1

1. Hole Diameter

| | \multicolumn{8}{c}{Hole No.} |
| | 1 | 101 | 201 | 301 | 401 | 501 | 601 | 701 |
|---|---|---|---|---|---|---|---|---|
| Example | ○ | ○ | ○ | ○ | ○ | ○ | ○ | ○ |
| Comparative Example | ○ | ○ | ○ | ○ | ○ | ○ | ○ | x |

○: within the tolerance range
x: out of the tolerance range

<Test 2: Shape Measurement for Burrs and the Like Using Profile Shape Analysis>

Measurement apparatus: microscope, all the focal three-dimensional surface shape measurement apparatus INFINITE FOCUS G4 (Alicona)

Evaluation: both Example and Comparative Example were used for drilling a hole 701 times, respectively, and the 1st hole, the 101st hole, the 201st hole, the 301st hole, the 401st hole, the 501st hole, the 601st hole and the 701st hole were evaluated.

Measurement method: the generation of burrs and the like is confirmed by enlarging the entire field range in a color image Evaluation criteria: the burrs were evaluated as ○ within the tolerance range when the burrs were smaller than 80 μm in both the longitudinal direction and the transverse direction, and were evaluated as x out of the tolerance range when the burrs were larger than or equal to 80 μm.

Test results were shown in the following Table 2.

As shown in the following Table 2, while no burr was observed in any hole made by the drill of Example up to the 701st hole, burrs were observed in the transverse direction around the 401st hole made by the drill of Comparative Example, and also burrs were observed in both the longitudinal direction and the transverse direction around the 501st hole and thereafter.

TABLE 2

2. Burrs

| | | \multicolumn{8}{c}{Hole No.} |
| | | 1 | 101 | 201 | 301 | 401 | 501 | 601 | 701 |
|---|---|---|---|---|---|---|---|---|---|
| Example | Longitudinal Direction | ○ | ○ | ○ | ○ | ○ | ○ | ○ | ○ |
| | Transverse Direction | ○ | ○ | ○ | ○ | ○ | ○ | ○ | ○ |

TABLE 2-continued

2. Burrs

|  |  | Hole No. | | | | | | | |
|---|---|---|---|---|---|---|---|---|---|
|  |  | 1 | 101 | 201 | 301 | 401 | 501 | 601 | 701 |
| Comparative Example | Longitudinal Direction | ○ | ○ | ○ | ○ | ○ | x | x | x |
|  | Transverse Direction | ○ | ○ | ○ | ○ | x | x | x | x |

○: within the tolerance range
x: out of the tolerance range

<Test 3. Presence or Absence of Internal Defects Using an Ultrasonic Flaw Detector>
Measurement apparatus: ultrasonic flaw detector (Olympus Corporation)
Evaluation: both Example and Comparative Example were used for drilling a hole 701 times, respectively, and the 1st hole, the 101st hole, the 201st hole, the 301st hole, the 401st hole, the 501st hole, the 601st hole and the 701st hole were evaluated.
Measurement method: observation and visualization of internal defects such as delaminations (inter-layer peeling phenomena)
Evaluation Criteria: the hole was evaluated as ○ without defects when no internal defect was observed, and was evaluated as x with defects when internal defects were observed.
Test results were shown in the following Table 3.
As shown in the following Table 3, while no internal defect was observed in any hole formed by the drill of Example up to the 701st hole, internal defects were observed in the 501st hole and thereafter made by the drill of Comparative Example.

TABLE 3

3. Internal Defects

|  | Hole No. | | | | | | | |
|---|---|---|---|---|---|---|---|---|
|  | 1 | 101 | 201 | 301 | 401 | 501 | 601 | 701 |
| Example | ○ | ○ | ○ | ○ | ○ | ○ | ○ | ○ |
| Comparative Example | ○ | ○ | ○ | ○ | ○ | x | x | x |

○: without defects
x: with defects

<Test 4. Measurement of Drill Abrasion Using a Microscope>
Measurement apparatus: microscope, digital microscope KH-8700 (HIROX CO., LTD.)
Evaluation: both Example and Comparative Example were used for drilling a hole 701 times, respectively, and the 1st hole, the 101st hole, the 201st hole, the 301st hole, the 401st hole, the 501st hole, the 601st hole and the 701st hole were evaluated.
Measurement method: measurement of the generation of defects, abrasion, and the like as well as the amount of abrasion, using expanded images of the drill forward end and the front.
Evaluation criteria: the abrased portion was measured per 100 holes, and the value deducted from the value of 100 holes before the measured hole indicated the abrasion value (μm/100 holes).
Test results were shown in the following Table 4.
As shown in the following Table 4, the drill of Example had a smaller amount of abrasion in all measurement stages as compared to the drill of Comparative Example.

TABLE 4

4. Amount. of Abrasion (amount of abrasion per 100 holes)

|  | Hole No. | | | | | | | |
|---|---|---|---|---|---|---|---|---|
|  | 1 | 101 | 201 | 301 | 401 | 501 | 601 | 701 |
| Example | 0 | 0.230 | 0.085 | 0.167 | 0.046 | 0.061 | 0.070 | 0.081 |
| Comparative Example | 0 | 0.243 | 0.195 | 0.216 | 0.094 | 0.080 | 0.134 | 0.116 |

Based on the above test results, it has been found that the drill according to the present invention has superior cutting ability and abrasion resistance to a carbon fiber composite material as compared to the drill of Comparative Example.

INDUSTRIAL APPLICABILITY

In the drill for a carbon fiber composite material according to the present invention, a forward-end small-diameter portion has inclination portions, the diameter between which gradually increases from the side of the drill forward edge toward the side of the drill rearward edge. For the drill has the inclination portions, at the time of drilling in a carbon fiber composite material, the drill forward end that has the smallest diameter is used first for drilling, and as the drilling action proceeds, the inclination portions, the diameters of which gradually increase, are used for expanding the hole, and then, for the first time, the four edges are used for cutting after the drill outer periphery reaches to the hole. Accordingly, the drill drills slowly in a stepwise manner in the carbon fiber composite material as compared to drilling with the four edges from the beginning, which can more easily prevent defects in carbon fiber composite materials after drilling, such as burrs, delaminations (inter-layer peeling phenomena), carbon fiber splinters, or mounds around the hole.

Thus, the drill is suitably used as a drill used for the operation of drilling a hole using a hand drill, a drill press or the like as well as it is used for a wide variety of applications including a positive feed drill for manufacturing aircraft, a machining center for a machining process, or the like. In particular, it is suitably used for drilling in a carbon fiber composite material used for aircraft or the like.

EXPLANATIONS OF REFERENCES

1 Drill (first embodiment)
11 Drill (second embodiment)
2 Chisel
3 Thinned cutting edge
4 Main cutting edge
5 Relief surface
6 Chip discharge groove
7 Drill diameter
8 Rotation locus
BC Back groove
BC2 Second back groove
M1 First margin portion
M1C Cutting edge of the first margin portion
M11 First forward-end small-diameter portion
M12 Inclination portion
M14 Outer peripheral groove M2 Second margin portion
M21 Second forward-end small-diameter portion
M22 Inclination portion
M221 First inclination portion
M222 Second inclination portion
M2C Cutting edge of the second margin portion
O Drill outer periphery

What is claimed is:

1. A drill for drilling holes in a carbon fiber composite material, the drill comprising:
   two cutting edges formed symmetrically around a rotation axis of the drill, each of the two cutting edges having a respective main cutting edge formed from a drill forward end toward a side of a drill outer periphery and further having a respective thinned cutting edge formed at a side of the drill forward end of the corresponding main cutting edge,
   two relief surfaces formed symmetrically about the rotation axis of the drill, and
   two first margin portions and two second margin portions,
   wherein a respective back groove is formed from each of the two relief surfaces toward the drill outer periphery, and wherein each respective back groove is disposed in between one of two first margin portions and a corresponding one of the two second margin portions,
   wherein each of the two first margin portions has a respective first forward-end small-diameter portion with a diameter smaller than a diameter of the drill, and wherein each first forward-end small-diameter portion is formed from the side of the drill forward end toward a side of a drill rearward end,
   wherein each of the two second margin portions has a respective second forward-end small-diameter portion with a diameter smaller than the first forward-end small-diameter portion corresponding thereto, and wherein each second forward-end small-diameter portion is formed from the side of the drill forward end toward the side of the drill rearward end,
   wherein each first forward-end small-diameter portion and each second forward-end small-diameter portion has a respective inclination portion, the diameter of each inclination portion gradually increasing from the side of the drill forward end toward the side of the drill rearward end,
   wherein the inclination portion of each first forward-end small-diameter portion has a respective relief surface,
   wherein the inclination portion of each second forward-end small-diameter portion has a respective first inclination portion and a respective second inclination portion, each first inclination portion having a different inclination angle than the corresponding second inclination portion,
   wherein each first inclination portion is respectively formed from the side of the drill forward end in a direction toward the side of the drill rearward end and wherein each first inclination portion has an inclination angle greater than an inclination angle of the corresponding inclination portion of each first forward-end small-diameter portion,
   wherein each second inclination portion is respectively formed from the side of the drill rearward end of the corresponding first inclination portion in the direction toward the side of the drill rearward end and wherein each second inclination portion respectively has an inclination angle identical to the inclination angle of the corresponding inclination portion of each first forward-end small-diameter portion, and
   wherein, at a same location in a longitudinal direction of the drill, a diameter extending from a respective drill forward end of one second inclination portion of the drill to a respective drill forward end of another second inclination portion of the drill is smaller than a diameter extending from one of the two first margin portions of the drill to another of the two first margin portions of the drill.

2. The drill according to claim 1, wherein each second inclination portion has a respective relief surface.

3. The drill according to claim 2,
   wherein the inclination portion of each first forward-end small-diameter portion has a relief angle from 5° to 10°, and
   wherein each second inclination portion has a relief angle from 0.5° to 1.5°.

4. The drill according to claim 3, wherein one or more outer peripheral grooves are formed in each of the two first margin portions.

5. The drill according to claim 4, wherein the one or more outer peripheral grooves provided in each of the two first margin portions that are formed symmetrically around the rotation axis are arranged to be staggered relative to the longitudinal direction of the drill.

6. The drill according to claim 2, wherein one or more outer peripheral grooves are formed in each of the two first margin portions.

7. The drill according to claim 6, wherein the one or more outer peripheral grooves provided in each of the two first margin portions that are formed symmetrically around the rotation axis are arranged to be staggered relative to the longitudinal direction of the drill.

8. The drill according to claim 1, wherein one or more outer peripheral grooves are formed in each of the two first margin portions.

9. The drill according to claim 8, wherein the one or more outer peripheral grooves provided in each of the two first margin portions that are formed symmetrically around the rotation axis are arranged to be staggered relative to the longitudinal direction of the drill.

* * * * *